Dec. 11, 1951  D. F. TOOT  2,578,158
ELECTRICAL CIRCUIT FOR TRANSMISSION AND CLUTCH CONTROL
Filed Oct. 18, 1947  2 SHEETS—SHEET 1

INVENTOR.
David F. Toot.
BY Harness & Harris
ATTORNEYS.

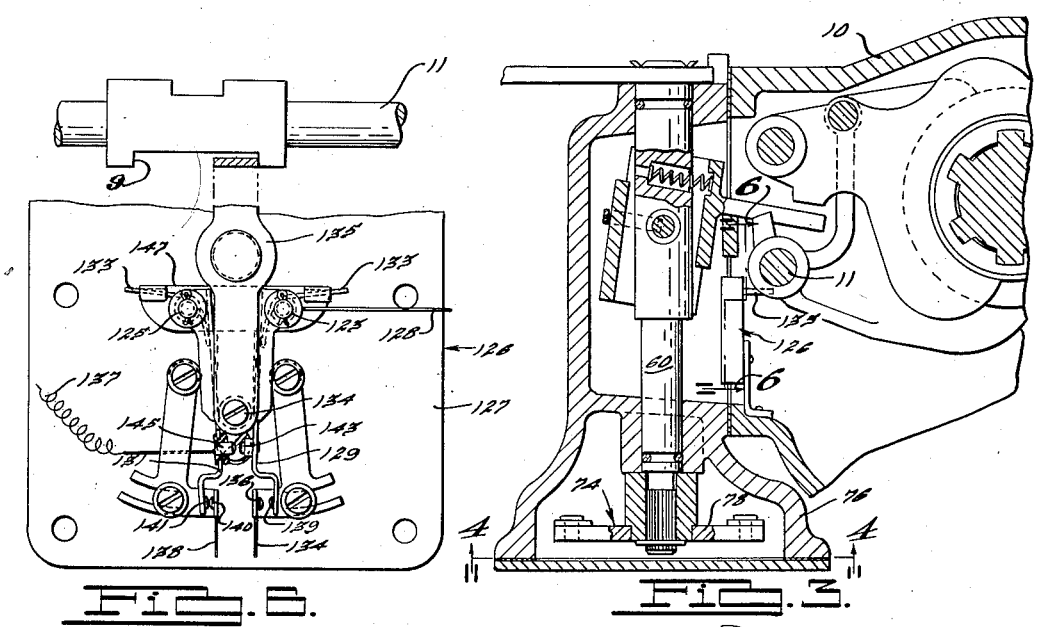

Patented Dec. 11, 1951

2,578,158

UNITED STATES PATENT OFFICE 2,578,158

ELECTRICAL CIRCUIT FOR TRANSMISSION
AND CLUTCH CONTROL

David F. Toot, Huntington Woods, Mich., assignor to Chrysler Corporation, Highland Park, Mich., a corporation of Delaware Application October 18, 1947, Serial No. 780,696

6 Claims. (Cl. 192—.073)

1

This invention relates to an improved electrical circuit for a transmission and clutch control apparatus.

My copending application, Serial No. 770,659, described an electrical circuit for use in controlling a transmission and clutch control apparatus. The apparatus included a power member in the form of a piston adapted to reciprocate through a complete cycle for each change in speed ratio drive and the apparatus also included a motion translating mechanism adapted to alternate movements of a transmission shift rail in response to successive cycles of the power member. This copending application incorporated a switch in the motion translating mechanism. It has been found desirable to provide a lost motion connection between the switch and the motion translating mechanism to assure that the electrical apparatus controlling the movement of the piston will be maintained in an energized condition for a longer interval of time. Under unusual circumstances when the transmission and control components are hard to move difficulties might be encountered if the electrical circuit is deenergized before sufficient movement and momentum have been imparted to the components by travel of the piston. It is an object of this invention to provide a means to assure that the supply of electricity to the solenoid controlling the operation of the power member will not be interrupted too soon during movement of the shift rail.

It is a further object of this invention to provide switch means associated with the motion translating device that has a lost motion linkage such that the switch will remain in its on position throughout a substantial portion of the movement of the power member in the direction requiring electricity for its movement.

Other objects and advantages of the invention will be apparent from the following description taken in connection with the accompanying drawing, in which:

Fig. 3 is a vertical section of a portion of the mechanism carried by the transmission housing;

Fig. 4 is a section on the line 4—4 of Fig. 3;

Fig. 5 is a section taken on the line 5—5 of Fig. 4;

Fig. 6 is a section on the line 6—6 of Fig. 3;

Figures 1, 2, 7, 8:
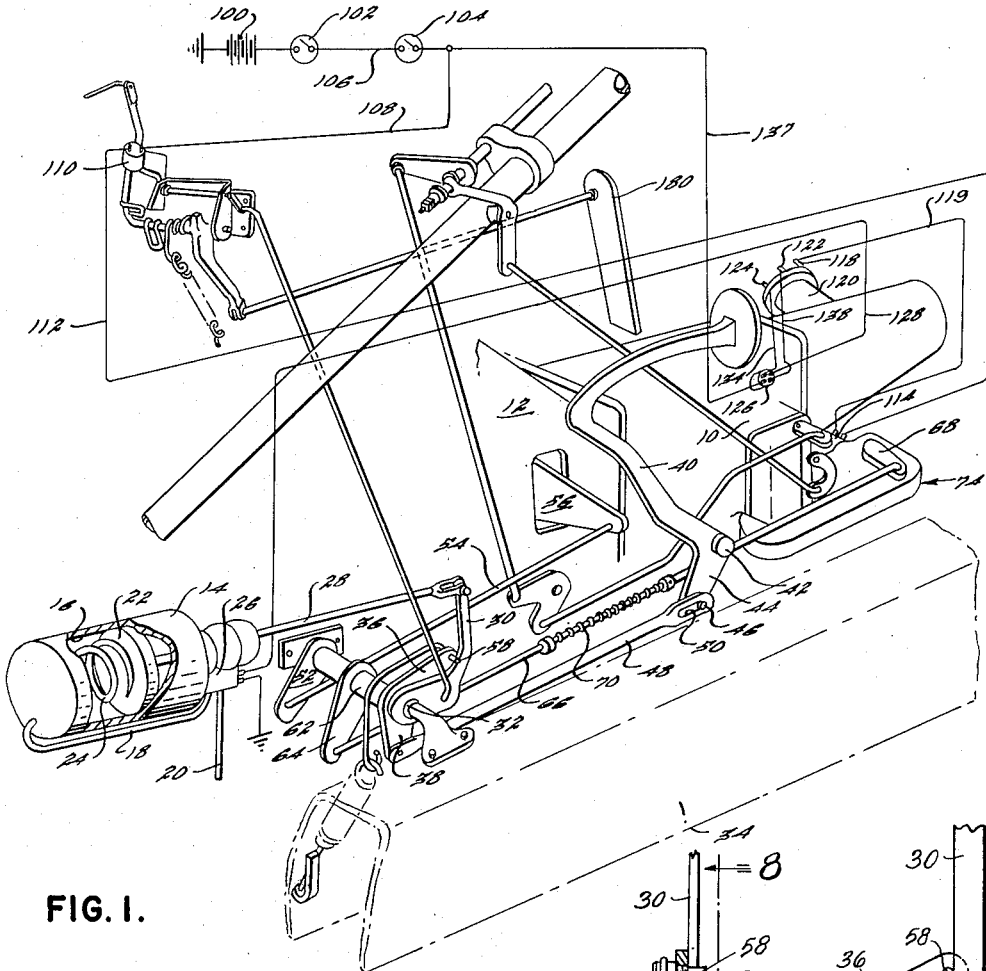
Fig. 1 is a perspective view of a clutch and transmission control apparatus incorporating my invention.
Fig. 2 is a circuit diagram of the electrical circuit used in the Fig. 1 control apparatus.
Fig. 7 is a partial section of the torque shaft and its associated levers shown mounted on the vehicle frame in Fig. 1.
Fig. 8 is a section on the line 8—8 of Fig. 7.

The control mechanism to be described herein is adapted to actuate a transmission of the type illustrated in Patent No. 2,284,191 and a conventional friction clutch. Fig. 3 illustrates the relationship of the control mechanism to the transmission.

The control system to be described is particularly adapted for use in conjunction with a friction clutch and transmission when they are associated with a fluid coupling. The relation of the fluid coupling to the control system is described in the copending application, Serial No. 661,298, filed April 11, 1946, by Carl A. Neracher et al.

A motor vehicle transmission 10 has a conventional friction clutch 12 operatively associated therewith as illustrated in Fig. 1. An automatic control mechanism is associated with the transmission and clutch and adapted to control the operation thereof in response to predetermined vehicle operating conditions. The automatic transmission control mechanism is superimposed on a manual control of the type described in Patent No. 2,284,191. The selector mechanism described in the above patent is normally in engagement with one of the shift rails. This shift rail is designated by the numeral 11 in the drawings herein. The automatic control apparatus to be described herein only actuates the selector mechanism to move that one shift rail and does not engage the selector mechanism with the other shift rail. Therefore, the discussion herein of a control mechanism will be directed to means to selectively rotate the vertical control shaft of the transmission in opposite directions and thereby move the one shift rail in opposite directions. This rotation of the control shaft will create a relatively fast or a relatively slow speed ratio drive depending upon the direction of movement of the shift rail. For reasons of simplicity this will be referred to herein as effecting a change in the speed ratio drive between that which is commonly referred to in a conventional transmission as a second speed drive and that which is commonly referred to as direct drive. It is to be understood, however, that the movements of the control apparatus could effect any other change in speed ratio drive desired.

The control apparatus is powered by a piston adapted to be actuated under selected vehicle operating conditions by manifold vacuum. An airtight housing 14 containing a cylinder 16 has tubular connections 18 and 20 with the engine intake manifold. A piston 22 is slidably mounted in cylinder 16 and a spring 24 acting on piston 22 and reacting on housing 14 urges piston 22 to one end of cylinder 16. A solenoid actuated valve 26 is positioned between the tubular connections 18 and 20 and adapted when energized to operatively connect the tubular connections 18 and 20 so that air will be evacuated from the cylinder 16 by the intake manifold vacuum of the engine. The solenoid operated valve 26 is also adapted to vent cylinder 16 when it operatively disconnects tubular connections 18 and 20. Manifold low pressure, or vacuum as it is commonly referred to, by evacuating air from cylinder 16 overcomes spring 24 when valve 26 is open thereby moving the piston 22 to the left in Fig. 1. A piston rod 28 connects the piston 22 with an arm 30 which is rotatably mounted on a torque shaft 32. The torque shaft 32 has one end thereof rotatably mounted on the vehicle frame 34 and the other end rotatably mounted adjacent the engine block (not shown) in a manner well known in the art. The torque shaft 32 and its associated levers are illustrated in detail in Figs. 7 and 8. A lever 36 keyed to shaft 32 is provided with a depending arm 38. The usual clutch pedal 40 is rotatably mounted at 42 on a shaft (not shown). An extension 44 of clutch pedal 40 depends below rotatable mounting 42 and has fixed thereto a pin 46. A rod 48 operatively connects arm 38 with pin 46. A slot 50 provided in rod 48 permits relative movement in one direction between rod 48 and pin 46. The upper end of lever 36 may be operatively associated with the usual over center clutch spring. An arm 52 is keyed to torque shaft 32. A rod 54 connects arm 52 with clutch throwout fork 56. Clutch throwout fork 56 engages a collar and operates a friction clutch 12 in a manner well known in the art. A typical clutch is illustrated and described in Patent No. 2,182,407. The lever 36 previously referred to is provided with a pin 58 which is adapted to be engaged by the arm 30 when the latter is rotated in a counterclockwise direction in response to movement of piston 22 under the influence of manifold vacuum. When the solenoid actuated valve 26 is energized and the piston 22 moved to the left in Fig. 1 piston rod 28 rotates arm 30 in a counterclockwise direction. Arm 30 engages and carries therewith the pin 58 associated with lever 36 thereby rotating the lever 36. The lever 36 is keyed to the torque shaft 32 and the torque shaft 32 is thus rotated. Rotation of the shaft 32 rotates the arm 52 which is keyed thereto. This pushes rod 54, rotates clutch throwout fork 56 and disengages the clutch 12. The rotation of the lever 36 and the depending arm 38 in this counterclockwise direction does not cause a depression of the clutch pedal 40 because of the cooperation of the slot 50 in rod 48 and the pin 46. This pin and slot combination permits movement of rod 48 to the right in Fig. 1 without an accompanying depression of clutch pedal 40. When solenoid actuated valve 26 closes the operative connection between tubular connections 18 and 20 and vents the cylinder 16, spring 24 returns the parts described in their original position permitting the clutch to reengage under the influence of its own self contained springs.

The movement of piston 22 also effects a change in transmission speed ratio drive by rotating a vertical transmission control shaft 60. Reference may be made to Patent No. 2,284,191 for a further description of the means by which rotation of shaft 60 effects a change in the transmission speed ratio drive. The torque shaft 32 is provided with a collar 62 which is rotatably mounted thereon. An arm 64 is keyed to collar 62. The arm 64 has a rod 66 operatively connected thereto. The other end of the rod 66 is connected to an arm 68 provided on the transmission. A spring means 70 may be associated with rod 66 and arm 68 as shown in Fig. 1. It cushions the motion of arm 68 in response to sudden movement of piston 22. The arm 30 is keyed to collar 62. Movement of the piston 22 is repeated by arm 68. As the piston 22 moves to the left in Fig. 1 the piston rod 28 rotates arm 30 in a counterclockwise direction. Rotation of collar 62 in a counterclockwise direction rotates arm 64 and moves rod 66 to the right in Fig. 1 thereby rotating the arm 68 in a counterclockwise direction. When the solenoid actuated valve closes and vents cylinder 16 the spring 24 returns piston 22 to the right end of housing 14 and moves arm 68 in a clockwise direction.

The arm 68 is adapted to actuate a motion translating device generally designated by the numeral 74. The device 74 is adapted to translate successive counterclockwise (in Fig. 1) rotations of arm 68 to alternate counterclockwise and clockwise rotations of transmission control shaft 60 (Figs. 3 and 4). The device 74 is mounted in a housing 76 associated with the lower portion of the housing containing transmission 10. A lever 78 has a central portion thereof keyed to the transmission control shaft 60. A pair of fingers 80 and 82 are each rotatably mounted on lever 78 on opposite ends thereof. The arm 68 previously referred to is keyed to a shaft 84 which is mounted in the housing 76. The arm 68 and shaft 84 are rotated in response to movement of the piston 22 in the vacuum cylinder. An arm 86 is keyed to shaft 84 inside of the housing 76. The fingers 80 and 82 are each provided with a recessed portion 88 adapted to receive a pin 90 which is carried by the end portion of arm 86. In operation the pin 90 moves between the fingers 80 and 82. Rotation of the arm 86 in a clockwise direction in Fig. 4 will cause the pin 90 to engage and pull one of the fingers to the right to thereby rotate lever 78 and shaft 60. The direction of rotation of shaft 60 will be dependent upon whether finger 80 or 82 was moved by pin 90. The direction of rotation of shaft 60 will determine the speed ratio drive to be effected by the transmission 10. Rotation of arm 86 in a counterclockwise direction in Fig. 4 is used to index the arm 86 relative to the fingers 80 and 82. The next succeeding clockwise movement of lever 86 will pull the other finger and reverse the rotation of shaft 60 thereby effecting a change in the transmission speed ratio drive. Movement of piston 22 under the influence of vacuum causes the clockwise (in Fig. 4) rotation of arm 86 and the spring return of piston 22 causes the counterclockwise rotation of arm 86.

Means to control the actuation of the valve 26 and piston 22 is illustrated in Figs. 1 and 2. A grounded source 100 of electric energy is connected through ignition switch 102 to a switch 104 by an electrical conductor 106. Switch 104 is adapted to provide a selection between manual and automatic operation of the clutch and transmission and may be placed on the dash or other location convenient to manipulation by the driver of the vehicle. Electrical line 108 connects switch 104 with a switch 110 adapted to be closed when the throttle is substantially closed. Line 112 connects switch 110 with a switch 114 located in the motion translating mechanism. Line 119 connects switch 114 with the inlet terminal 118 of a vehicle speed responsive governor 120. The governor is provided with outlet terminals 122 and 124 and is adapted to electrically connect terminal 118 with the terminal 122 below a predetermined vehicle speed and to electrically connect the terminal 118 with the terminal 124 above this predetermined speed. A switch 126 is adapted to be actuated by movement of the shift rail in the transmission. This switch is illustrated in Figs. 3 and 6. The switch 126 comprises a backing plate 127 having a pair of spaced stationary contacts 136 and 140 secured thereto. A pair of depending arms 129 and 131 are pivotally mounted at 123 and 125 on plate 127 and adapted to straddle the contacts 140 and 136. The arms 129 and 131 are urged toward each other by springs 133 associated therewith. An actuating member 135 is pivotally mounted on plate 127 and has a portion 134 thereof received between the arms 129 and 131. The shift rail 11 is provided with a slot 9 adapted to receive the other extremity of the member 135 so that a lost motion connection is provided between the shift rail and the member 135. Movement of the shift rail 11 causes a rotation of member 135 and rotation of the arms 129 and 131. Arm 129 is provided with a contact 139 adapted to engage contact 136. Arm 131 is provided with a contact 141 adapted to engage contact 140. Arms 129 and 131 are provided with cooperating contacts 143 and 145 which are adapted to engage each other. The contact 145 is insulated from arm 131. The contact 143 is electrically connected to arm 129. The arms 129 and 131 are electrically connected to a bar 147 which is connected with the solenoid operated valve 26 by a line 128. A line 137 interposed in the circuit of Fig. 2 between the switch 104 and switch 110 is connected to the terminal 145 on arm 131. A line 134 electrically connects the terminal 124 of the speed responsive governor to the stationary contact 136 of the rail switch 126. A line 138 connects terminal 122 of the speed responsive governor to the stationary contact 140 of the rail switch 126. When the shift rail 11 is in its direct drive position which is shown in Fig. 6 an electrical connection is provided between the line 138 from the speed responsive governor to the line 128 connected to the solenoid operated valve 26. This connection extends from line 138 through contact 140, contact 141, arm 131, bar 147 to line 169. It should be noted that the movement of the shift rail 11 to the left in Fig. 6 caused the member 135 to be pivoted in a counterclockwise direction thereby moving the arm 129 away from the contact 136 and leaving the arm 131 free to be rotated in a counterclockwise direction by the spring 133 until its rotation was stopped by the engagement of the contact 141 with the stationary contact 140. When a change in speed ratio drive is effected by the movement of the shift rail 11 to the right in Fig. 6, the member 135 is released by the notch 9 in the shift rail 11. This permits the arms 129 and 131 to move toward each other under influence of springs 133 until the contacts 143 and 145 are in engagement. During this interval in which the piston 22 and shift rail are in motion a circuit is provided through line 137, contact 145, contact 143, arm 129 and line 128 to shift solenoid valve 26. When the other extremity of the slot 9 in the shift rail 11 engages member 135 to rotate it in a clockwise direction the contact 139 engages contact 136 and rotation of the arm 129 is thereby prevented. The rotation of member 135 moves arm 131 out of operative engagement with contacts 140 and 143 so that the only contact remaining in engagement when the shift rail is at its extreme position to the right in Fig. 6 is made by contacts 139 and 136. A circuit is provided thereby from line 134 through contacts 136, 139, arm 129, bar 147 and line 128 to the shift solenoid valve 26.

The switch 114 which is associated with the motion translating mechanism is illustrated in Fig. 5. The lines 112 and 116 are connected to switch 114. A body portion 162 is provided with terminals 164 and 166. These terminals are electrically connected to lines 112 and 116 respectively. A plunger element 168 carries a contact bar 170 which is adapted to bridge the terminals 164 and 166 and a ball 169. A spring 171 urges the plunger element 168 away from the terminals. The arm 86 which was previously described in the motion translating mechanism carries a pin 90 which is adapted to control the switch 114. A slidable plate 172 is positioned below the plunger element 168 and mounted for guided linear movement. Pins 174 in housing 76 cooperate with slots 176 to guide plate 172. Plate 172 is provided with an opening 178 which is adapted to receive the ball 169 when it is aligned therewith to permit the plunger element 168 to be forced downwardly to open the switch The plate 172 is provided with a pair of spaced ears 180 and 182 which are adapted to be engaged by the pin 90 to effect a sliding movement of the plate as in incident to rotation of the arm 86 during a change in speed ratio drive. The ears 180 and 182 are preferably so spaced that as the arm 86 moves to the right in Figs. 4 and 5 a substantial portion of its movement in this direction is completed before the ear 180 is engaged and the switch 114 opened. On the movement of the arm 86 to the left in Figs. 4 and 5 the ear 182 is picked up and the switch 114 closed so that it will be closed preparatory to the next change in speed ratio drive. The provision of a means to delay the opening of the switch 114 in response to movement of arm 86 constitutes an improvement over the apparatus described in my copending application, Serial No. 770,659. The advantages described in my copending application are retained by the present construction of switch 114. In addition, however, the lost motion connection between the movement of arm 86 and the opening of switch 114 assures that the shift solenoid 26 will be maintained in an energized condition for a longer interval of time. The immediate interruption of the switch 114 as described in my copending application might under unusual circumstances when the transmission and control components were hard to move present difficulty relating to deenergization of the solenoid operated valve 26 by the opening of the switch 114 before sufficient movement and momentum had been imparted to the components by travel of the piston 22. However, such difficulties are overcome by the lost motion connection described herein as existing between arm 86 and the switch 114.

Referring to Fig. 1 the operation of the electrical circuit thus far described will be explained. In operation, the driver of the vehicle closes the ignition switch 102 as an incident to operation of the vehicle. If the driver wishes the automatic control mechanism described herein to effect for him changes in transmission speed ratio drive he so designates by closing switch 104 on the dash. When the vehicle is operating and the driver desires that a shift or change in speed ratio drive be effected he so signals by releasing his foot from an accelerator pedal 180 thereby closing switch 110. It will be noted that the switch 114 is normally in its closed position as illustrated in Fig. 5 prior to energization of the control system. The governor terminal 118 has been illustrated in Fig. 2 as in contact with the terminal 122. This indicates that the vehicle speed is low and the lower speed ratio drive desired. Electricity from the grounded storage battery 100 thus passes through the closed switches 102, 104, 110, 114 and through the terminal 118 to the terminal 122. If the vehicle is at that time operating in direct drive the shift rail 11 is in the left hand position in Fig. 6. The rail switch 126 is therefore closed at contact 140 and line 128 operatively connected with line 138 and terminal 122. The grounded solenoid actuated valve 26 is thereby energized. The energization of valve 26 exposes the cylinder 16 to the intake manifold of the engine thereby moving piston 22 to the left in Fig. 1 to disengage the clutch 12 and to rotate transmission control shaft 60. Rotation of shaft 60 moves the shift rail 11 to the right in Fig. 6 to effect a lower speed ratio drive. The movement of the shift rail 11 to the extreme right closes the switch at contact 136 thereby connecting lines 134 and 128. As long as the vehicle speed remains below the predetermined governor speed the circuit is broken by the governor 120 and valve 26 deenergized. When the circuit is broken and the solenoid actuated valve 26 deenergized piston 22 is moved to the right in Fig. 1 by spring 24. This indexes the lever 86 of the motion translating mechanism of Fig. 4 and permits the clutch 12 to reengage. During normal operation of the vehicle the driver will then depress the accelerator pedal 180 thereby opening switch 110. If the vehicle should then accelerate sufficiently so that the predetermined speed of the governor is exceeded the terminal 118 thereof will contact the terminal 124. Since the vehicle is operating in its lower speed ratio drive with the shift rail 11 moved to the right in Fig. 6 the switch is closed at contact 136. If under these conditions the operator releases the accelerator pedal 180 and the switch 110 is closed a circuit is established and solenoid 26 is energized. The energization of solenoid 26 causes a clutch disengagement, a shift to direct drive in the transmission and clutch reengagement.

The line 137 and contacts 143 and 145 are necessary for if the operator closed the accelerator switch 110 and before the completion of the shift should accidentally or through confusion step on the accelerator pedal 180 he would open the accelerator switch and interrupt the shift. The line 137 and contacts 143 and 145 provide means for by-passing the accelerator switch after the shift has been initiated. It will be noted by referring to Fig. 6 that after the initial movement of the shift rail 11 from either of its end positions the switch 126 is closed by contacts 143 and 145 thereby connecting line 137 with line 128 and providing a circuit for energizing the solenoid which is independent of the accelerator switch 110.

The reason for the incorporation of switch 114 is best understood by an explanation of difficulties that could be encountered if the switch was not present in the circuit. If, for example, while the vehicle was climbing a grade a shift should be initiated it is possible that the vehicle speed would decrease below governor speed thereby changing the circuit through governor controlled switch 120 and causing the solenoid 26 to remain energized. For example, on an upshift if as the contact 140 of the shift rail switch 126 was engaged the governor controlled switch 120 should cross over and contact terminals 118 and 122 a circuit to the solenoid 26 would thereby be established. This would keep the cylinder 16 evacuated and the piston 22 in the left hand position in Fig. 1 thereby preventing reengagement of the clutch. However, it should be noted that if switch 114 is present in the circuit it would be open under these circumstances because the arm 86 would be in the right hand position in Fig. 5. This would assure that the solenoid 26 would be deenergized and the clutch reengaged. After the reengagement of the clutch when the arm 86 is returned to the left in Fig. 5 the switch 114 would, as in incident thereof, be closed preparatory to the next energization of the system.

I claim:

1. In a motor vehicle a variable speed transmission, control mechanism including a power operated member adapted to move from an initial position through a predetermined cycle including movement in a first direction to a predetermined position and return in response to predetermined vehicle operating conditions, a first means adapted to alternate the drive in said transmission between a first and a second speed ratio drive in response to successive cycles of said power member, electrical means to control the movement of said power member including a switch having a member movable between a first and a second position, means forming a lost motion operative connection between said switch member and said first means adapted to position said switch member in said first position when said power member is in said initial position and while said power member moves through a portion of its movement in said first direction and to position said switch member in said second position when said power member is in said predetermined position.

2. In an automotive vehicle provided with an accelerator operated switch, a battery, a vehicle speed responsive governor operated switch, a transmission including change speed mechanism, power means for selectively operating the change speed mechanism and including a movable element adapted to move from an initial position in a first direction to a second position and return as an incident to operation of said transmission, motion transmitting means operatively connecting said movable element and said change speed mechanism, a valve for controlling the operation of said power means, and means for controlling the operation of said valve including electromagnetic means, electrical means for controlling the operation of said valve operating electromagnetic means including a circuit through the said accelerator operated switch and governor operated switch, a third switch having a movable member, and means providing a lost motion connection between said switch movable member and said motion transmitting means, said third switch and said lost motion connection means being operable to electrically connect said circuit with said battery when said movable element is in said initial position and during a portion of the movement of said movable element in said first direction.

3. In an automotive vehicle provided with an accelerator operated switch, a battery, a vehicle speed responsive governor operated switch having a pair of terminals adapted to be selectively energized when the speed of said governor is less than a predetermined value and greater than a predetermined value, a transmission including change speed mechanism selectively operable to provide a first speed ratio drive and a second speed ratio drive, power means for selectively operating the change speed mechanism and including a movable power element adapted to move from a first to a second position and return for each change in transmission speed ratio drive, motion transmitting means operatively connecting said movable element and said change speed mechanism, a valve for controlling the operation of said power means, means for controlling the operation of said valve including electromagnetic means having a movable member adapted to open and close said first switch, electrical means for controlling the operation of said valve operating electromagnetic means including a first switch, a circuit from said battery through said first switch and said accelerator operated switch to said governor operated switch, a third switch means having a first circuit therethrough electrically connected to one of said governor operated switch terminals and adapted to be energized when said transmission is operating in said first speed ratio drive and a second circuit therethrough electrically connected to the other of said governor operated switch terminals and adapted to be energized when said transmission is operating in said second speed ratio drive, electrical connections between said third switch and said electromagnetic means and said battery and means providing a lost motion connection between said movable member of said first switch and said motion transmitting means, said movable member and said lost motion connection means being operable to open said first switch when said movable power element is in said second position and to maintain said first switch closed when said movable power element is in said first position and intermediate said positions.

4. In a motor vehicle a variable speed transmission including change speed mechanism selectively operable to provide a first speed ratio drive and a second speed ratio drive in said transmission, power means for selectively operating the change speed mechanism and including a movable power element adapted to move through a cycle from an initial position to a second position and return in response to predetermined vehicle operating conditions, motion transmitting means operatively connecting said movable element and said change speed mechanism and adapted to change said transmission speed ratio drive in response to each cycle of said power element, electrical means to control the movement of said element comprising a solenoid, a source of electric current, a governor controlled switch having an inlet terminal and first and second outlet terminals, means connecting said source to said inlet terminal, a second switch means having a first terminal electrically connected to said first outlet terminal of said governor and a third terminal electrically connected to said second outlet terminal of said governor controlled switch, means associated with said second switch means and adapted to electrically connect the first terminal thereof with the second terminal thereof when said transmission is operating in said first speed ratio drive and to electrically connect the first terminal thereof with the third terminal thereof when said transmission is operating in said second speed ratio drive, switch means having a movable member adapted to open and close said last mentioned switch means, means providing a lost motion connection between said movable member and said motion transmitting means, said movable member and said lost motion connection being operable to disconnect said source from said governor controlled switch when said movable power element is in said second position and to electrically connect said source to said governor controlled switch when said power element is in said initial position and in some positions intermediate said initial position and said second position.

5. In a motor vehicle a variable speed transmission, including change speed mechanism selectively operable to provide a first speed ratio drive and a second speed ratio drive in said transmission, power means for selectively operating the change speed mechanism and including a movable power element adapted to move through a cycle from an initial position to a second position and return in response to predetermined vehicle operating conditions, motion transmitting means operatively connecting said power element and said change speed mechanism and including a first rotatable shaft operatively connected to said transmission, a pair of oppositely directed lever arms keyed to said shaft, a first finger element rotatably mounted on one of said lever arms and having an engageable portion, a second finger element rotatably mounted on the other of said lever arms and having an engageable portion, a movable element operatively connected to said power member for movement from an initial position to a second position and return in response to movement of said power member through said cycle, said element being adapted to selectively engage said engageable portions of said fingers and to transmit motion through said fingers to rotate said first shaft, said element being adapted to engage one of said engageable portions and move one of said finger elements when moved from said initial position and to index itself when returned so that it will engage the other of said engageable portions during its next successive movement away from said initial position thereby to alternately move said first shaft in a first direction and in a second direction to operate said change speed mechanism to effect said first and said second speed ratio drives in response to successive cycles of movement of said movable member, electrical means to control the movement of said movable power element and including a switch having a member movable between a first and a second position, means forming a lost motion operative connection between said switch movable member and said movable element and adapted to position said switch in said first position when said movable element is in said initial position and during a portion of the movement of said movable element between said initial and said second positions and to position said switch in said second position when said movable element is in said second position.

6. In an automotive vehicle provided with an engine, an accelerator operated switch, a battery, a vehicle speed responsive governor operated switch, a transmission including change speed mechanism, a clutch drivingly connecting said engine and said transmission, power means for selectively operating the change speed mechanism and including a movable element adapted to move from an initial position in a first direction to a second position and return as an incident to operation of said transmission, a first motion transmitting means operatively connecting said movable element and said clutch, a second motion transmitting means operatively connecting said movable element and said change speed mechanism, a valve for controlling the operation of said power means, means for controlling the operation of said valve including electromagnetic means, electrical means for controlling the operation of said valve operating electromagnetic means including a circuit through the said accelerator operated switch and governor operated switch, a third switch having a movable member, and means providing a lost motion connection between said switch movable member and said second motion transmitting means; said third switch and said lost motion connection means being operable to electrically connect said circuit with said battery when said movable element is in said initial position and during a portion of the movement of said movable element in said first direction.

DAVID F. TOOT.

REFERENCES CITED

The following references are of record in the file of this patent:

UNITED STATES PATENTS

| Number | Name | Date |
|---|---|---|
| 1,864,103 | Tenbrook | June 21, 1932 |
| 2,187,824 | Britton | Jan. 23, 1940 |
| 2,208,384 | Morrison | July 16, 1940 |
| 2,208,828 | Adams | July 23, 1940 |
| 2,222,913 | Pescara | Nov. 26, 1940 |
| 2,351,067 | Randol | June 13, 1944 |